United States Patent [19]

Brichard

[11] 3,801,411
[45] Apr. 2, 1974

[54] GLASS DRAWING METHOD, APPARATUS, AND GLASS ARTICLE

[75] Inventor: Claude Brichard, Moustier, sur Sambre, Belgium

[73] Assignee: Glaverbel S.A., Brussels, Belgium

[22] Filed: Aug. 21, 1972

[21] Appl. No.: 282,009

[30] Foreign Application Priority Data
Aug. 20, 1971 Luxembourg ............... 63756

[52] U.S. Cl. .................. 161/1, 65/84, 65/95, 65/204
[51] Int. Cl. .......................... C03b 15/04
[58] Field of Search ........ 65/83, 84, 85, 95, 96, 65/203, 204; 161/1

[56] References Cited
UNITED STATES PATENTS
2,896,376  7/1959  Crandon, Jr. ............... 65/204
3,447,838  11/1969  Henry et al. ............... 65/83 X
3,533,250  10/1970  Malicheff ............... 65/84
2,607,168  8/1952  Drake ............... 65/204

*Primary Examiner*—Arthur D. Kellogg
*Attorney, Agent, or Firm*—Spencer & Kaye

[57] ABSTRACT

In a glass drawing apparatus in which glass is drawn upwardly through a drawing chamber from a bath of molten glass to form a glass ribbon and in which the ribbon becomes dimensionally set while traversing a path through the chamber, due at least in part to the action of a cooler located in the chamber adjacent one side of the ribbon, the quality of the glass ribbon is improved, and in particular its tendency to "neck-in" is reduced or eliminated, by withdrawing gas from a region of the chamber disposed at the same side of the ribbon path as the cooler and located at a greater distance from the ribbon path than is the side of the cooler nearest that path, and by simultaneously discharging gas so as to cause it to flow transverse to the ribbon path in the space between that path and the cooler.

33 Claims, 6 Drawing Figures

GLASS DRAWING METHOD, APPARATUS, AND GLASS ARTICLE

BACKGROUND OF THE INVENTION

This invention relates to the manufacturing of sheet glass. The invention is particularly concerned with processes and apparatus in which glass is manufactured by supplying molten glass to a drawing zone and drawing a continuous ribbon of glass from the surface of the molten glass at that zone and along a path extending through a drawing chamber in the lower portion of which there is at least one cooler which promotes dimensional setting of the ribbon and then through an annealing lehr contiguous with that drawing chamber.

Processes of the kind referred to are well known. During the drawing of such a glass ribbon it is exposed to the influence of thermally heterogeneous environmental gas currents which are due to various causes. One of the principal causes is the chimney effect of the annealing lehr. As a result of the strong natural draft forces, produced therein, hot gas currents flow upwardly along the central region of the ribbon from the intensely hot drawing zone, through the drawing chamber and into the annealing lehr, while cooler currents of gases flow back into the drawing chamber from the annealing lehr along the walls of the apparatus. The resulting convection currents tend to be propagated over the surface of the molten glass in regions of the molten glass supply kiln adjacent the drawing chamber so that there tends to be a non-uniform heat distribution not only in the gaseous environment in contact with the ribbon but also in the gaseous environment in contact with the molten glass flowing into the drawing zone from which the ribbon is drawn.

Another source of thermal heterogeneities in the environmental conditions to which the glass is exposed is the cooler or coolers provided in the lower portion of drawing chamber. The provision of such a cooler or coolers is required for promoting the setting of the glass ribbon, but the maintenance of the coolers at a sufficiently low temperature to promote the required rapid dimensional setting of the glass ribbon inevitably influences the pattern of gas currents which prevails in the drawing chamber and the nature of this influence is such that the heat distribution in the atmosphere in contact with the glass is further adversely affected.

In the performance of the above-described processes there are various other environmental conditions created which militate against uniform cooling of the ribbon over its entire width but the nature of the contribution of the present invention does not require that they be described.

The non-uniform temperature profile across the path of the drawn ribbon, due to the above-described main convection currents induced by natural draft forces, and the existence of thermally heterogeneous gas currents induced by the action of the coolers are significant causes of defects in the geometry of the drawn sheet glass. Any irregularity in the cooling action on the glass is an impediment to the drawing of sheet glass with faces which are truly flat and parallel at all points. Due to the lack of true flatness and parallelism of the sheet faces, the sheet glass causes angular deflections of light waves travelling through the glass so that objects viewed through the glass under certain conditions appear distorted.

The counter-current flow of the central and outer main convection currents of gas at different temperatures tends, if the temperature disparity is excessive, to cause "necking-in" of the ribbon at its central region. Moreover, the difference in temperature between these currents contributes to non-uniform cooling of the molten glass flowing along the supply kiln into different parts of the width of the ribbon.

The consequent glass viscosity variations across the drawing zone affects in an unfavorable way what is known as the thickness profile of the glass ribbon. The thickness profile can be represented by a line plotting points on a graph representing the thickness of the ribbon at intervals of, for example, 10 cm across its width. The quality of the sheet glass insofar as its geometry is concerned is indicated in part by the shape of this profile and in part by the magnitude of the difference between the minimum and maximum thickness values, which magnitude is known as "the overall thickness variation."

The thermally heterogeneous gas currents which tend to be produced by the action of the cooler or coolers in the lower portion of the drawing chamber also adversely effect the planeity of the faces of the drawn sheet glass. Unless special precautions are taken, gases cooled by such coolers will fall onto the molten glass adjacent the meniscus and, as there is inevitably some variation in the temperature of such falling gas currents from one location to another they cause unequal cooling of the glass. This gives rise to surface defects in the form of waves running more or less parallel to the line of draw of the glass. These wave defects are quite apparent when viewing objects at a shallow angle through the sheet glass in a plane normal to the line of draw, particularly while varying the viewing angle.

In some cases, one or more additional coolers, called "secondary coolers" are provided at a higher level in the drawing chamber, such secondary coolers being normally closer to ribbon path than are the coolers in the lower portion of the drawing chamber. The secondary cooler or coolers tend to influence the heat distribution in the drawing chamber in a way which gives rise to surface defects known as "martelage" or "hammering" in the drawn sheet glass. This kind of defect takes the form of a random distribution of shallow surface depressions usually measuring from 1 to 4 cm across.

It should be recognized that while the different defects in the sheet glass which have been described are attributable to the different causes which have been explained, there is inevitably an interaction between superimposed systems of gas currents and the precise characteristics or the severity of a given type of defect may in any given case depend upon both main and secondary causes. Thus there is inevitably an interaction between cool gas currents falling onto the surface of the molten glass flowing to the drawing zone and the central and outer main convection currents propagated along that surface and there is likewise in any given process, some interaction between the main convection currents flowing along the faces of the ribbon and the flow of gases due to the cooling action of any secondary cooler or coolers which may be provided.

Many proposals have been made for reducing the disparity in temperature between the different regions across the width of the path of the glass ribbon through the drawing chamber which disparity is due to the natural draft or chimney effect described above.

In effect these proposals are directed toward creating gaseous currents of more predetermined temperature and velocity characteristics in the lower portion of the drawing chamber, or alternatively to act on such convection currents to modify their distribution across the ribbon path.

In practice some of these hitherto proposed measures have been found to be capable of improving the optical qualities of the sheet glass. However, in many cases, necking-in of the glass ribbon still occurs, due possibly to the persistence of the high velocity upward current of gas along the central part of the ribbon width where the temperature of the glass tends inevitably to be higher than at the outer portions of the ribbon width.

SUMMARY OF THE INVENTION

It is therefore an object of the present invention to influence the flow of gas in contact with the ribbon in the drawing chamber in such a way as to reduce defects in the geometry of the sheet glass due to the persistence of very hot high speed gas currents along the central part of the width of the ribbon, caused by natural draft forces.

The present invention is employed in the manufacture of sheet glass by supplying molten glass to a drawing zone and drawing a continuous ribbon of glass from the surface of the molten glass at that zone and along a path extending through a drawing chamber, in the lower portion of which there is at least one cooler and in which the ribbon becomes dimensionally set, and then through an annealing lehr contiguous with that drawing chamber. According to the invention, at the side of the ribbon path at which a cooler is present or, if there is a cooler on each side of such path, then at at least one side of such path, gas is continuously or intermittently withdrawn from the free atmosphere within the drawing chamber at a location or locations whose spacing from the ribbon path is greater than the spacing between the ribbon path and that cooler which is at the same side of the path, the latter spacing being between the ribbon path and the side of the cooler which faces the ribbon path, and gas is simultaneously discharged back into the atmosphere so as to flow in a direction transverse to the ribbon path and between that path and that cooler.

It has been found that in such a process according to the invention, there is less tendency for local necking-in of the glass ribbon to occur. It has been established that this result is dependent on such withdrawl of gas and simultaneous discharge of gas back into the free environment of the ribbon. The creation of low pressure in the chamber at a location on one side of the ribbon which is further from the ribbon than is the main cooler on that side, undoubtedly tends to draw gas away from the vicinity of the ribbon. That in itself would possibly reduce the severity of the action exerted on the central part of the ribbon width by the high velocity, high temperature ascending convection currents of gas at that side of the ribbon path.

On the other hand, any reduction of pressure within the drawing chamber is liable to have the adverse effect of increasing the tendency for currents of cold air to be drawn into the chamber through cracks in the refractory walls or via imperfectly sealed joints between such walls and components for circulating cooling fluid to and from the main cooler, such as conduits which extend through such walls into the drawing chamber.

The discharge of gas into the drawing chamber at a given location simultaneously with the withdrawal of gas from the free environment of the ribbon at another location enables the withdrawal forces to be exerted without creating a depression, or a greater depression, in the drawing chamber as a whole.

In the process according to the invention, the discharge of gas takes place adjacent the ribbon, which has the effect of increasing the volume rate of upward flow of gases along the ribbon. This increase in the volume rate of upward flow of gases along the ribbon from the vicinity of a main cooler, combined with the suction forces simultaneously exerted at a location or locations further from the ribbon, tends to cause the flow of gases toward the suction zone to occur from the immediate vicinity of the ribbon, which is what is required.

Moreover, in order that the discharge of gas into the environment of the ribbon between the ribbon and a main cooler shall not result in a heat distribution across the ribbon which is even more unfavorable than that which exists if the ascending and descending convection currents under natural draft forces are allowed to persist undisturbed, the volume of gas withdrawn from the free atmosphere in the drawing chamber is discharged back into the said atmosphere with at least a component of direction across, i.e. transverse to, the ribbon path. The discharge of gas across the ribbon path, either in a direction normal to the direction of movement of the ribbon or in a direction which is oblique to the direction of movement of the ribbon past the cooler, has been found to have a beneficial effect on the heat distribution across the ribbon path.

It can thus be said that the withdrawal and discharge of gas from and into the free atmosphere in the drawing chamber, at the locations referred to, and the choice of the direction in which such discharge takes place so that it exerts gas-displacing forces in a direction or directions across the ribbon path, which are characterizing features of a process according to the invention, lead to the described improvement in the geometry of the drawn sheet glass due to the manner in which the features are functionally interrelated as above described.

In addition to reducing or avoiding necking-in of the glass ribbon, a secondary effect of processes according to the invention is a reduction in a tendency for the glass ribbon or sheet glass to be impaired by waves. However, measures known per se for countering wave formation can be used when necessary in combination with measures according to the present invention.

Preferably, there is a cooler on each side of the ribbon path in the lower part of the drawing chamber and a withdrawal of gas from, and reintroduction of gas into, the free atmosphere within the drawing chamber takes place on each side of such ribbon path.

Preferably, the withdrawl of gas at at least one side of the ribbon path takes place from a location or locations, above the level of the top of the cooler located in the lower part of the drawing chamber on that same side of the ribbon path. In general, the beneficial influence of the gas flow conditions within the drawing chamber is most evident when the withdrawl of gas from the free atmosphere within the drawing chamber takes place above that level.

In certain embodiments of the invention, there is, on at least one side of the ribbon path, in addition to a cooler in the lower portion of the drawing chamber, a secondary cooler located at a higher level in the drawing chamber, and such a withdrawl of gas takes place at the general level of such secondary cooler. When that condition is observed, it is found that the withdrawal and reintroduction of gas from and into the free atmosphere within the drawing chamber has the secondary effect of reducing the tendency for the action of the secondary cooler to cause hammering of the adjacent face of the glass ribbon.

Advantageously, such a withdrawal of gas from at least one side of the ribbon, takes place at a location or locations adjacent a front, rear, or side boundary wall of the drawing chamber. The withdrawl of gas from such a location or locations has also been found to aid the attainment of the required results. This is possibly due to the fact that the suction forces then act to withdraw from the free atmosphere, within the chamber, some of the gas which has been cooled by descent along a wall or walls of the chamber.

The place or places at which the withdrawal of gas takes place may be located not only adjacent a boundary wall of the drawing chamber but also at the general level of a secondary cooler as above referred to. However, tests have shown that in certain cases a notable improvement in the geometry of the drawn sheet glass, insofar as its freedom from necking-in is concerned, is best achieved according to the invention by causing the withdrawal of gas to occur at a location or locations adjacent the bottom of a front or rear wall of the drawing chamber, as the case may be.

The precise reason why very good results are often achieved by affecting the withdrawal of gas from such a location or locations is not known with certainty, but it is observed that the environmental temperature near to the lower extremity of the front and rear walls of the drawing chamber tends to be particularly high because such locations are in the corner angles formed by the intersection of such walls and the bottom walls of the drawing chamber, i.e. the corner angles defined by the vertical and horizontal limbs of the conventional L-blocks.

Advantageously, the discharge of gas into the atmosphere within the drawing chamber takes place in one direction across the ribbon path and also in the reverse direction across the ribbon path. Discharge of gas in both directions across the ribbon path helps to produce the greatest improvement in the heat distirbution across the ribbon.

When reference is made herein to the discharge of gas in one direction and in the reverse direction across the ribbon path, it is not intended that the different directions of discharge must be directly opposed directions. The intent is rather that there is a discharge of gas away from one margin of the ribbon and toward the other, and also a discharge of gas away from that other margin towards the one margin. The different directions of discharge may, however, be directly opposed. For example, both of them may be normal to the ribbon path. Alternatively, such opposed directions may be inclined with respect to a line normal to the ribbon path and converge toward a zone opposite the longitudinal central region of the ribbon.

In certain embodiments of the invention in which a discharge of gas into the drawing chamber takes place in respectively opposite directions across the ribbon path, there is simultaneous discharge of gas in the different directions across the ribbon path. Such a simultaneous discharge is easy to accomplish because there is no necessity to employ flow control means for timing the discharges of gas in the different directions to cause them to take place at different times.

However, in preferred embodiments of the invention the discharges of gas in the different directions across the ribbon path take place first in the one direction and then in the reverse direction and so on alternately. Although this makes it necessary to employ flow control means for timing the discharge of gas in the different directions, the added structure is justified by the fact that with this technique it is easier to achieve a heat distribution across the path of the ribbon which is substantially uniform and remains substantially uniform in course of time.

The withdrawal of gas from the free environment within the drawing chamber may take place at locations which are on opposite sides of a vertical plane which is normal to the ribbon and contains the longitudinal center line of the ribbon. For example, the points of withdrawal may be located opposite the outer thirds of the ribbon width. Preferably, however, the withdrawal of gas takes place from a zone which extends across at least a central portion of the ribbon width. The withdrawal of gas from a zone which is opposite a central portion of the ribbon path is conducive to the attainment of the required result of drawing gas away from the path of the ascending convection current along the central region of the ribbon.

Particular importance is attached to processes according to the invention in which the withdrawal of gas at at least one side of the ribbon path takes place from locations disposed on opposite sides of a vertical plane normal to the ribbon and containing its longitudinal center line as mentioned above, and in which the quantities of gas withdrawn at the different locations are discharged back into the free atmosphere within the drawing chamber so as to flow in different directions across the ribbon path, between that path and the cooler located in the lower portion of the drawing chamber on that same side of the ribbon path. When performing such a process it has been found that there is in general a very marked improvement in the quality of the drawn sheet glass, in that the sheet glass is substantially free of necking-in and has a substantially uniform thickness over at least the greater part of its width. The improvement is particularly marked in the case where the discharge of gas takes place alternately first at one and then at the other of such discharge locations.

The invention embraces processes in which the flow of gas from a withdrawal location to a discharge location takes place along a duct in which the forces for causing such flow of gas are exerted by mechanical means. The use of mechanical means, e.g. propellers, has the advantage that the forces can be very easily and accurately controlled and the advantage that the composition of the atmosphere in the drawing chamber does not have to be modified in any way. On the other hand it has to be recognized that the mechanical means must be designed and constructed to be capable of withstanding the very high working temperatures in the drawing chamber.

Accordingly, in preferred processes according to the invention, the flow of gas from a withdrawal location to a discharge location takes place along a duct under forces generated by discharging gas within that duct. Such processes have the advantage that they do not rely upon the use of moving parts in the drawing chamber for generating the necessary forces to cause the transfer of gas from one location to another in the free environment within the drawing chamber.

In certain embodiments of such processes the transfer forces are generated according to the ejector principle by discharging gas through an injection tube located within a portion of the duct which is shaped to function as a diffuser. The amount of gas injected within a given time can be small in relation to the total volume of gas displaced along the duct so that the energy consumption is quite small and the injected gas does not need to be preheated to a very high temperature. In other embodiments of such processes, the transfer forces are constituted by draft forces which are generated by discharging combustible gas within and in a direction along such a duct and burning this combustible gas within the duct. The resulting draft forces cause gas from the free atmosphere within the drawing chamber to become drawn into the duct and to discharge from its other end after having mixed with the products of combustion.

The invention can be applied in a variety of surface-drawing processes. For example, the invention can be applied in a Pittsburgh type drawing process in which the drawn ribbon passes upwardly through a vertical annealing lehr surmounting the drawing chamber, and in a sheet glass drawing process of the Libbey-Owens type in which the ribbon of glass which is drawn upwardly into the drawing chamber is bent about a bending roller preparatory to passing into a horizontal annealing lehr contiguous with the drawing chamber. At the drawing zone, the ribbon may be drawn upwardly from the surface of a bath of molten glass of such depth that molten glass flows into the ribbon from the full depth of such bath. As an alternative, the ribbon may be drawn from a bath of molten glass of such depth that the molten glass which flows into the ribbon is derived from the upper levels of such bath. As a further alternative, the ribbon may be drawn from a supply, of molten glass floating on a mass of material of higher specific gravity than the glass.

The invention includes apparatus for use in carrying out the above-described process according to the invention. Apparatus according to the invention is provided in a system for use in manufacturing sheet glass and composed of a drawing chamber and a contiguous annealing lehr, means for drawing a continuous ribbon of glass into such drawing chamber from a drawing zone fed with molten glass and conducting the ribbon along a path extending through such drawing chamber and annealing shaft, and at least one cooler located adjacent the ribbon path near the bottom of the drawing chamber. The apparatus according to the invention includes means for continuously or intermittently withdrawing gas from the free atmosphere within the drawing chamber at a location or locations on the side of the ribbon path at which the cooler is present or, if there is a cooler on each side of such path, then from a location or locations at at least one side of such path, such location or locations being spaced further away from the path of the ribbon than is any part of the cooler at the corresponding side of the ribbon and means for causing gas to be discharged into the atmosphere so as to flow in a direction or directions across the ribbon path in the space between such path and the corresponding cooler. This apparatus affords the advantage of permitting the drawing of sheet glass which is not marred, or is marred only to a negligible extent, by necking-in.

Various advantageous optional features which can be incorporated in apparatus according to the invention will now be referred to. Most of these features are for the purpose of producing process features which have already been described. The advantage of these further features of apparatus will be understood from what has already been stated about the corresponding process features.

Apparatus according to the invention may incorporate means for effecting the withdrawal of gas, for example from one or more locations above the level of the cooler located in the lower part of the drawing chamber on the same side of the ribbon path as, and/or from one or more locations at the general level of a secondary cooler which may be present, at that side of the ribbon, and/or from one or more locations adjacent a front, rear or side boundary wall of the drawing chamber. The apparatus may incorporate means for effecting the discharge of gas in one direction and also in the reverse direction across the ribbon path, either simultaneously or alternately in the different directions.

The gas withdrawal means may for example be arranged to effect the withdrawal of gas from a zone which extends across at least a central portion of the width of the ribbon.

In certain embodiments of apparatus according to the invention there is, on at least one side of the ribbon path, for the purpose of effecting the withdrawal and discharge of gas from and into the free atmosphere within the drawing chamber, at least one duct which is located wholly within the drawing chamber and one end of which is located at a withdrawal location, while its other end is located at a discharge location, and there is means for generating force to cause gas to enter the one end of the duct from the free atmosphere in the drawing chamber, to flow along such duct, and to discharge from the other end thereof.

In some embodiments of apparatus according to the invention there are, on at least one side of the ribbon path, twin ducts having gas entry end portions located on opposite sides of a vertical plane normal to the ribbon and containing its longitudinal center line, and gas discharge end portions disposed in the lower part of the drawing chamber and oriented so that quantities of gas flowing along such different ducts will be discharged into the free atmosphere within the drawing chamber in different directions across the ribbon path, in the space between that path and the cooler located in the lower portion of the drawing chamber on that same side of the ribbon path.

In some forms of apparatus according to the invention mechanical means is provided in the or each duct for generating the forces for causing such gas flow along the duct.

In other embodiments of apparatus according to the invention, a gas injection tube is provided within the or each duct and means is provided for injecting gas into such duct through the injection tube for generating the forces for causing such gas flow along the duct. Preferably the injection tube and the portion of the duct surrounding such injection tube are arranged to function as an ejector.

Advantageously, means is provided within or adjacent, the discharge end of the or each duct for promoting laminar flow of gas discharged from such duct.

The invention may be applied to apparatus as previously defined wherein the annealing lehr is a vertical annealing lehr surmounting the chamber.

The invention may also be applied to apparatus as above defined wherein there is a bending roller about which the drawn glass ribbon bends when the apparatus is in use and wherein the annealing lehr is substantially horizontal.

Apparatus in which the invention is used may be of various different basic designs. In some cases there is a supply channel for holding a bath of molten glass of such depth that when the apparatus is in use molten glass flows into the ribbon path from the full depth of such bath. In other embodiments there is a supply channel for holding a bath of molten glass of such depth that when the apparatus is in use molten glass flows into the ribbon only from the upper levels of such bath. The invention may also be used in apparatus as above defined which includes a molten glass feed channel along which molten glass feeds to the drawing zone while floating on a mass of material of higher specific gravity.

The invention includes sheet glass manufactured by a process according to the invention as above defined.

DESCRIPTION OF THE PREFERRED EMBODIMENTS

The embodiments which will be described below are not to be regarded as limitative to the subject matter of the invention. They only emphasize a few of the possible features of the invention and do not exclude modifications which would be within the scope of the invention.

Figure 1:
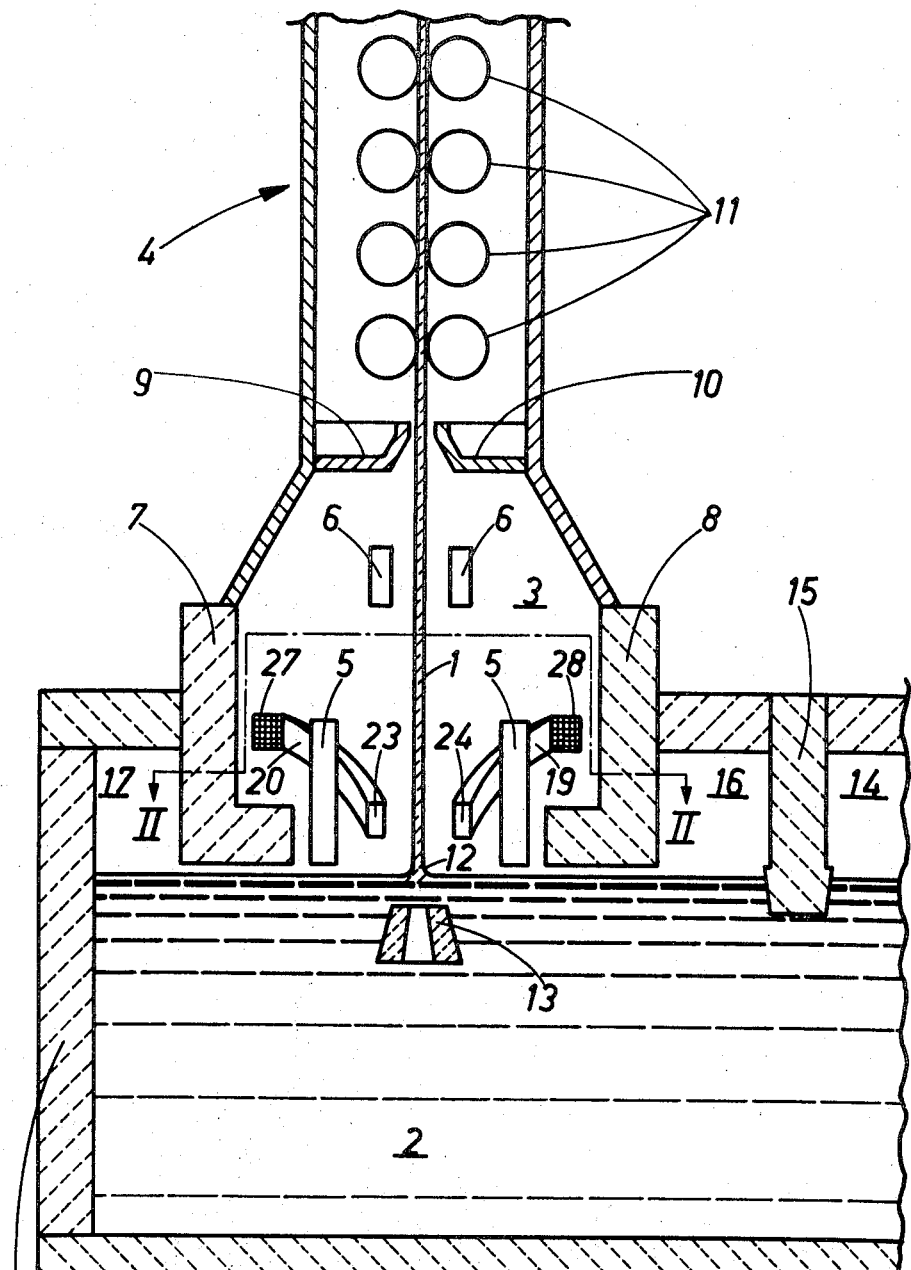
FIG. 1 is a cross-sectional elevational view of part of a drawing chamber of the classic Pittsburgh type as well as of the corresponding feeding channel, provided with one preferred embodiment of the invention.
Figure 2:
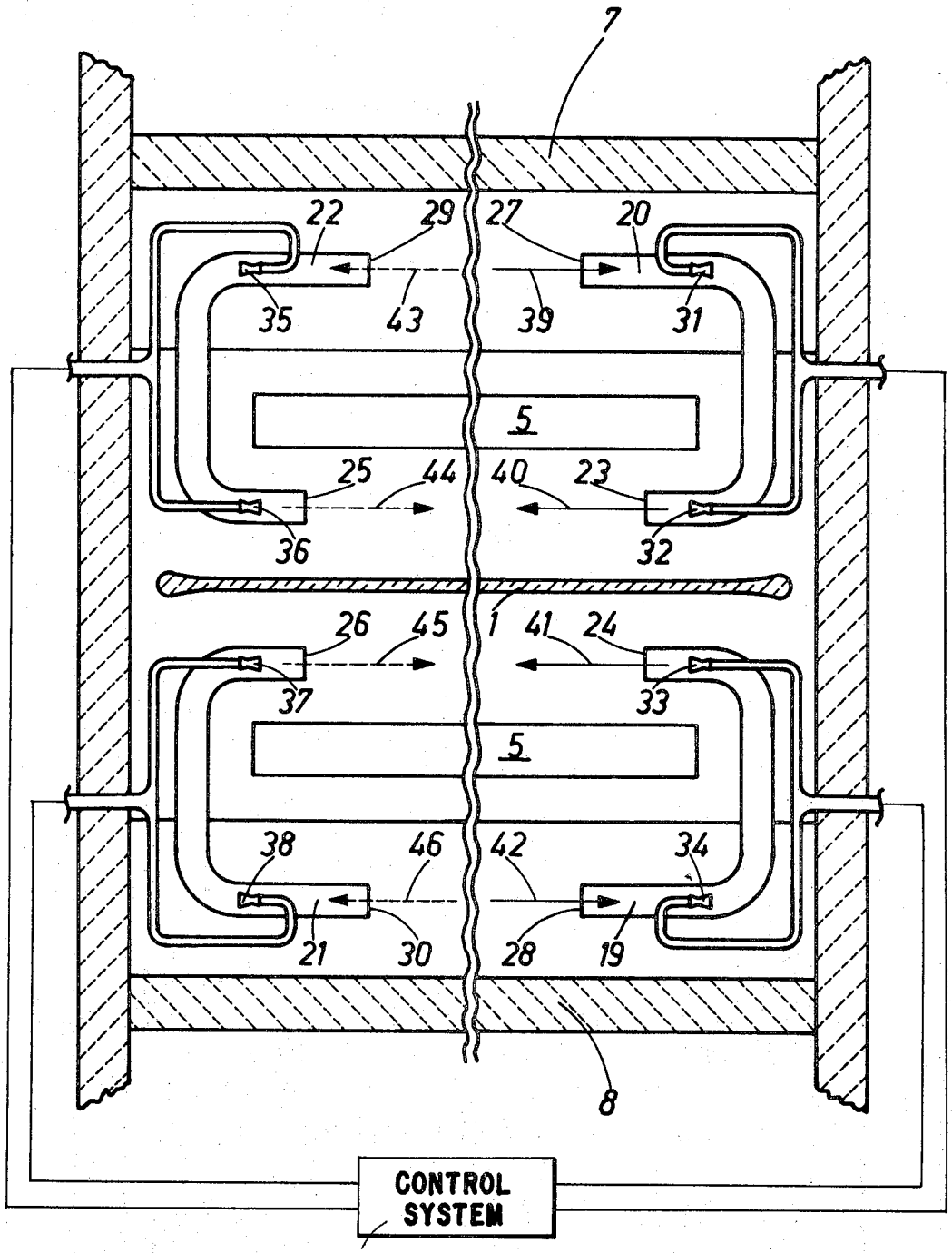
FIG. 2 is a partly broken-away cross-sectional plan view taken along line II—II of FIG. 1.

FIGS. 1 and 2 show the feature of an apparatus employing the invention for drawing glass according to the Pittsburgh process. In this apparatus, a ribbon of glass 1 is drawn from a molten glass supply 2 through a drawing chamber 3 surmounted by an annealing lehr or drawing machine 4. The drawing chamber includes, in a quite standard way, main coolers 5, secondary coolers 6 and two L-blocks 7 and 8, and its upper end is bounded by catch pans 9 and 10 which separate the chamber 3 from the drawing machine 4 in which the ribbon of glass is entrained by rollers 11.

The glass bath from which the ribbon 1 is drawn contains, under the meniscus of the ribbon 12, a forming member 13 which is immersed in the glass bath and which is called a "draw bar". The bath 2 is fed with molten glass, originating from a melting furnace (not shown), through a first zone 14 which is generally called a connection or connection channel and which leads to a shut-off 15 the lower end of which is partly immersed in the molten glass. Before reaching the region of the drawing chamber, the glass moves through a second zone 16 called a feeding channel which is situated between the shut-off 15 and the L block 8. Downstream of the drawing chamber, a third zone 17 is provided between the L block 7 and the terminal end wall 18 and contains the molten glass which passes under the draw bar.

According to the present invention, a transfer of a part of the gases constituting the environment of the chamber 3 is brought about between a location within the chamber which is relatively remote from the faces of the ribbon of glass 1 and another location which is relatively close to the faces of the ribbon.

To that end, four tubes or ducts 19, 20, 21 and 22 are disposed, as shown in FIGS. 1 and 2, in such a way that each of those ducts will have a respective end 23, 24, 25 or 26 located between the ribbon of glass 1 and a corresponding main cooler 5, while the other respective end 27, 28, 29, or 30, situated further above the surface of the molten glass bath 2 than are the ends 23, 24, 25 and 26, is located between a corresponding L block 7 or 8 and the corresponding main cooler 5.

Inside of the ducts 19, 20, 21 and 22, and in the vicinity of their ends, are provided gas injectors 31, 32, 33, 34, 35, 36, 37 and 38, the purpose of which is to bring about the transfer of a gas quantity from one location within the drawing chamber to another location in the chamber. The feeding and the control of those injectors, which are of a known type, is effected by a suitable control system 140 which can be constructed according to well known principles, using simply controllable valves and a suitable control timer.

According to a particular feature of the embodiment shown in FIG. 2, the injectors 31 to 38 are operated as follows:

At a certain moment which will be designated t for facilitating understanding, the injectors 31 to 34 are operated together so as to subject the environment prevailing within the drawing chamber to a movement which is represented by the solid line arrows 39, 40, 41 and 42. Primarily, the injectors 31 and 34 are then creating a suction of the gases from the drawing chamber through the ducts 20 and 19 while the injectors 32 and 33 are blowing into the chamber the gases which have been drawn in at the other ends 27 and 28 of these ducts. At the following moment which will be designated t', the injectors 35 to 38 are in operation while the injectors 31 to 34 are not fed any longer, and this makes it possible to create within the drawing chamber an environment which is designated by the dotted line arrows 43, 44, 45 and 46. The operation cycles of the injectors 35 to 38 as well as of the injectors 31 to 34, are carried on, as described above, according to a determined frequency schedule.

It has been found that, for achieving a convenient efficiency, the value of the frequency of the operating cycle of the two sets of injectors should vary according to the temperature in the drawing chamber. The desirable frequency decreases with the temperature and it has been possible to observe that, at a relatively low temperature, one did not find an efficient frequency lower than one cycle every 10 minutes, while at a more elevated temperature, the values of that frequency may be of the order of 1 to 10 cycles per minute.

It should also be pointed out that it is possible to adapt the injection parameters, in particular the quantity as well as the temperature of the injected gases, to the thermodynamic characteristics of the environment prevailing in the drawing chamber at a given moment. Moreover, in order to avoid any deterioration of the lower part of the ribbon of drawn glass, the ends of the ducts 19, 20, 21 and 22 may be provided with grids or filters, two of which have been diagrammatically represented at 27 and 28 in FIG. 1.

Figure 3:
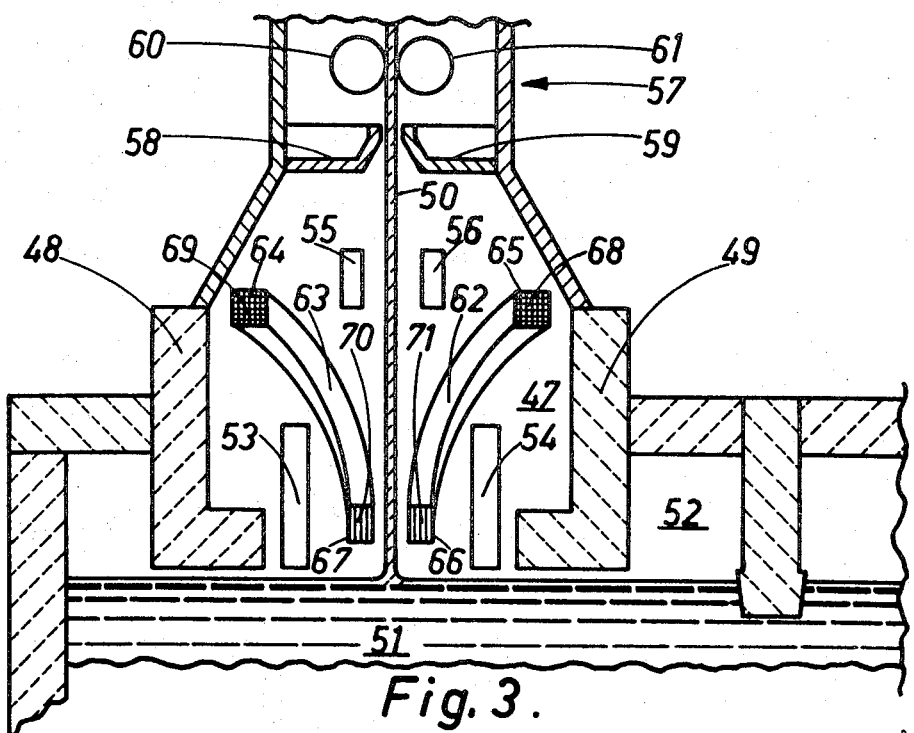
FIG. 3 is an elevational, cross-sectional view of part of a drawing chamber of the classic Pittsburgh type provided with another preferred embodiment of the invention.

FIG. 3 shows a drawing apparatus of the classic Pittsburgh type which is quite similar to that shown in FIG. 1. The apparatus is provided with an arrangement according to the present invention which is slightly different from that shown in FIGS. 1 and 2. In the drawing chamber 47 transversally defined by the L blocks 48 and 49 of the usual type, the ribbon of glass 50 is drawn from a bath of molten glass 51 with the aid of a "draw bar" (not shown), the bath of molten glass 51 being fed via a connection or feeding channel 52 from a glass melting furnace (not shown). In the vicinity of the surface of the molten glass 51, are located main coolers 53 and 54 whose purpose is to quickly set the ribbon of glass 50. Those main coolers 53 and 54 are associated with secondary coolers 55 and 56 which ensure an elevated drawing speed.

After having moved through the drawing chamber 47, the ribbon of glass 50 is led through an annealing lehr 57 which is separated from the drawing chamber by catch pans 58 and 59 and which is provided with rollers, only one pair of which is shown at 60 and 61.

In the drawing chamber, there is provided an apparatus of a suitable shape according to the invention but which is somewhat different from the apparatus shown in FIGS. 1 and 2. As in the case of the embodiment of FIGS. 1 and 2, the apparatus is here composed of four ducts, only ducts 62 and 63 being visible, each duct having approximately a U shape. The ends 66 and 67 of one arm of the U shaped ducts are each positioned between a corresponding one of the main coolers 53 and 54 and the ribbon of glass 50, while the ends 64 and 65 of the other arm of the U shaped ducts are located in the upper zone of the drawing chamber. This differs from the apparatus shown in FIGS. 1 and 2 where the ends of the U shaped ducts which are furthest away from the ribbon of glass are positioned between the main coolers and the corresponding L blocks.

The ends 64 and 65 located in the upper part of the drawing chamber 47 in FIG. 3 are provided with filters 68 and 69 which prohibit the suction of dust particles which are liable to deteriorate the quality of the surface of the bath of drawn glass, while the ends of the ducts 62 and 63 located next to the lower part of the ribbon of drawn glass are provided with grids 66 and 67. Exactly as for the apparatus shown in FIGS. 1 and 2, the apparatus shown in the FIG. 3 also includes injectors positioned inside of the ducts 62 and 63. The injectors in the ducts are operated alternately.

The apparatus shown in the FIG. 3 presents the advantage of enabling hot gases present in the upper part of the drawing chamber to be transferred to the vicinity of the lower part of the ribbon of drawn glass.

Figure 4:
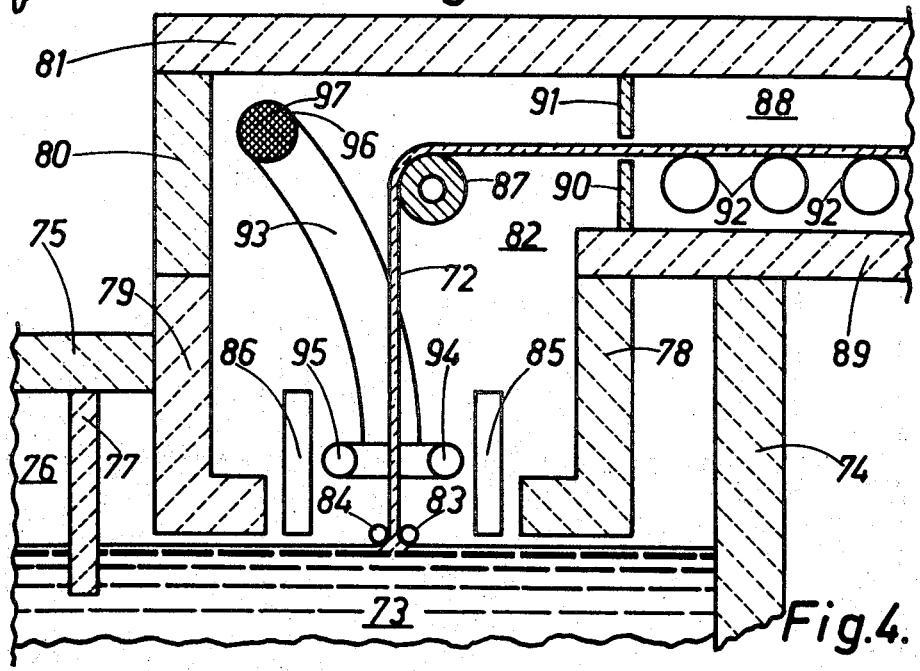
FIG. 4 is an elevational, cross-sectional view of part of another type of drawing chamber provided with a further preferred embodiment of the invention.

FIG. 4 shows another example of the application of an apparatus according to the invention to the drawing of a sheet of glass 72 from a bath of molten glass 73. In FIG. 4 there is shown parts of the end wall 74 and the cover 75 of the feeding channel 76 containing the bath of glass 73.

The environment prevailing in the drawing kiln is separated from the environment of the channel 76 by a shut-off 77 the lower part of which dips into the bath of glass 73. L blocks 78 and 79 form with the wall 80 and the cover 81 a drawing chamber 82 in which the ribbon of glass 72 is drawn from the surface of the bath of glass 73.

The ribbon of glass, whose width is maintained constant by knurled rollers 83 and 84 is at first drawn upwardly, moves between main coolers 85 and 86, and then, while passing over a bending roller 87, is progressively brought to a horizontal orientation. Thereafter, it is entrained into a horizontal annealing lehr 88 defined by a crown 81 and a lower wall 89 and separated from the drawing chamber 82 by a refractory screen 90 and by a curtain 91 made of asbestos for example. While being displaced, the ribbon of glass is supported by the rollers 92 of a conveyor.

In order to keep to a minimum the detrimental influence of the thermally heterogeneous action of the gas currents which may move along the ribbon 72 and, as a result, in order to improve the quality of the surface of the ribbon 72, there is provided, according to the present invention, a U shaped duct 93, one end of which is terminated by two ducts situated on each side of the ribbon 72 and the ends 94 and 95 of which are located between the main coolers 85 and 86 and the ribbon of glass 72. The other part of the duct 93 is composed of just one end 96 which is situated at a level higher than the level of the upper part of the main coolers.

The end 96 is provided with a filter 97 so as to avoid the transfer of dust both to the meniscus and the lower part of the ribbon of drawn glass. Inside of the duct 93, are positioned injectors, such as for the apparatus shown in FIG. 2, in order to enable the transfer of a quantity of gas from the environment within the drawing chamber between a region located above the main coolers and a region located between the main coolers and the ribbon of drawn glass. It is to be understood, by way of modification, that the means described are applicable to the apparatus used for drawing a continuous ribbon of glass according to the Libbey-Owens process.

Figure 5:
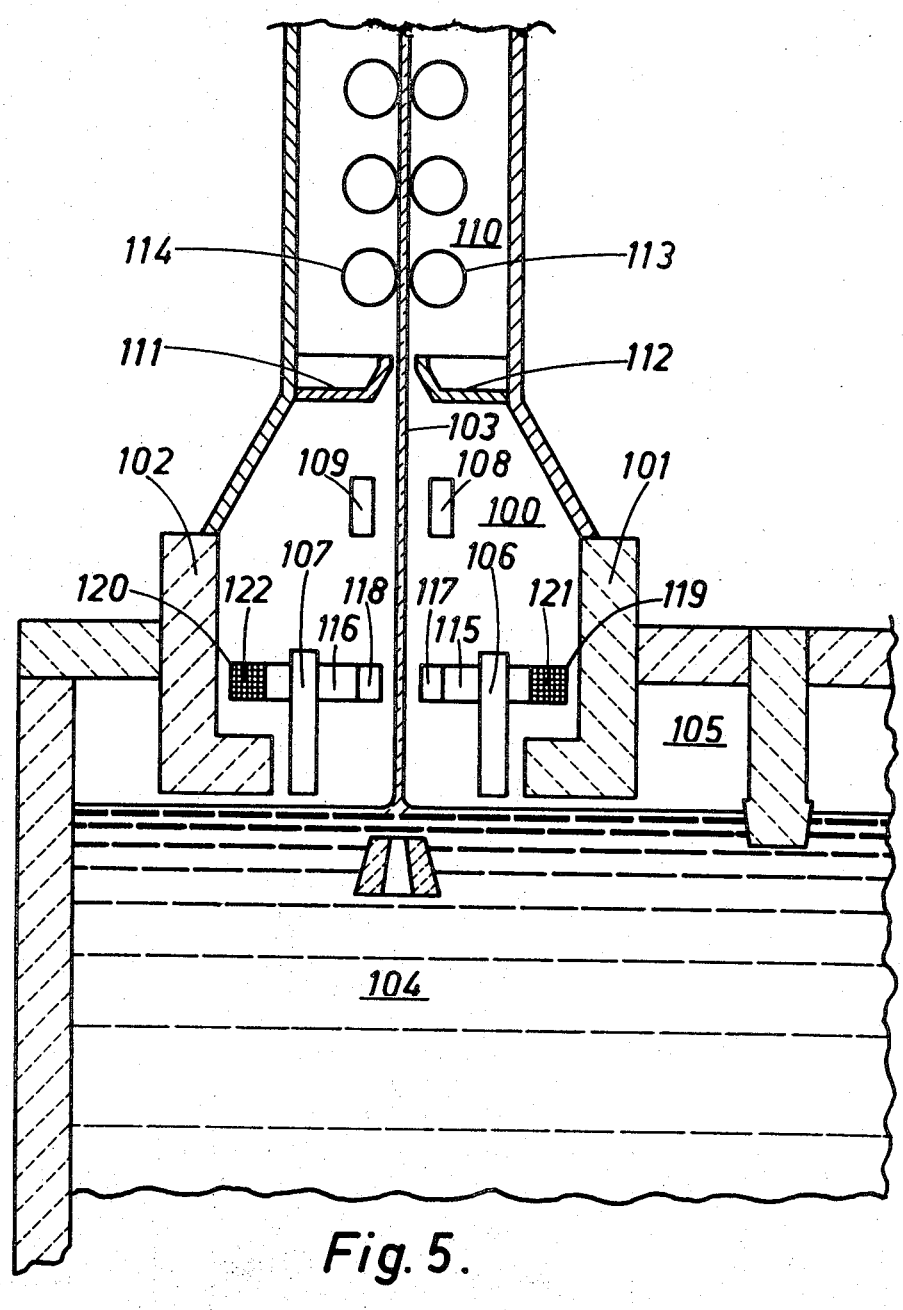
FIG. 5 is an elevational, cross-sectional view of part of a drawing chamber provided with another preferred embodiment of the invention.

FIG. 5 shows a drawing chamber of the classic Pittsburgh type which is quite similar to those shown in FIGS. 1–3 and which is provided, by way of modification, with an apparatus according to the present invention. In the drawing chamber 100, defined transversally by L blocks 101 and 102 of the usual type, the ribbon of glass 103 is drawn from a bath of molten glass 104 with the aid of a "draw bar" (not shown). The bath of molten glass is fed via a connection or feeding channel 105 from a melting furnace (not shown).

In the vicinity of the surface of the bath of molten glass 104, are located main coolers 106 and 107 whose purpose is to quickly set the ribbon of glass 103. These main coolers are associated with secondary coolers 108 and 109 which are necessary owing to the drawing speeds which are currently employed in the glass industry. After having moved through the drawing chamber 100, the ribbon of glass 103 is led to an annealing lehr 110 which is separated from the drawing chamber 100 by catch pans 111 and 112 and which is provided with rollers, only one pair of which has been shown at 113 and 114. The other elements of the annealing lehr such as, for example, the cooling elements and the baffles, have not been illustrated.

The drawing chamber 100 contains an apparatus according to the invention which has a particular shape. Just as for the apparatus shown in FIGS. 1–4, the present apparatus is composed of ducts 115 and 116 having approximately the shape of a U section, the plane of which is substantially horizontal. The ends 117 and 118 of one arm of each U shaped duct are located between the main coolers 106 and 107 and the ribbon of glass 103, while the other ends 119 and 120 are positioned at the same level in relation to the surface of the bath of molten glass but are situated between the main coolers and the corresponding L blocks.

The ends 119 and 120 are provided with filters 121 and 122 to avoid the displacement of dust particles in the vicinity of the faces of the ribbon of drawn glass and within ducts 115 and 116 there are provided injectors or propellers which are operated as described above with reference to FIG. 2.

FIGS. 3 and 5 each show two ducts adjacent the same edge of the ribbon and each disposed to a respective side of the ribbon path. These embodiments could be constituted by but two such ducts and their gas driving devices could be operated continuously or in alternation. Each embodiment could also be composed of four ducts, two additional ducts, identical with those shown, being disposed adjacent the near edge of the ribbon. In this case it is preferable for gas to be propelled alternately through the two ducts on the same side of the ribbon path.

Similarly in the case of the embodiment of FIG. 4, a second duct arrangement identical with that shown could be disposed adjacent the near edge of the ribbon and gas driven through the two duct arrangements alternately.

Figure 6:
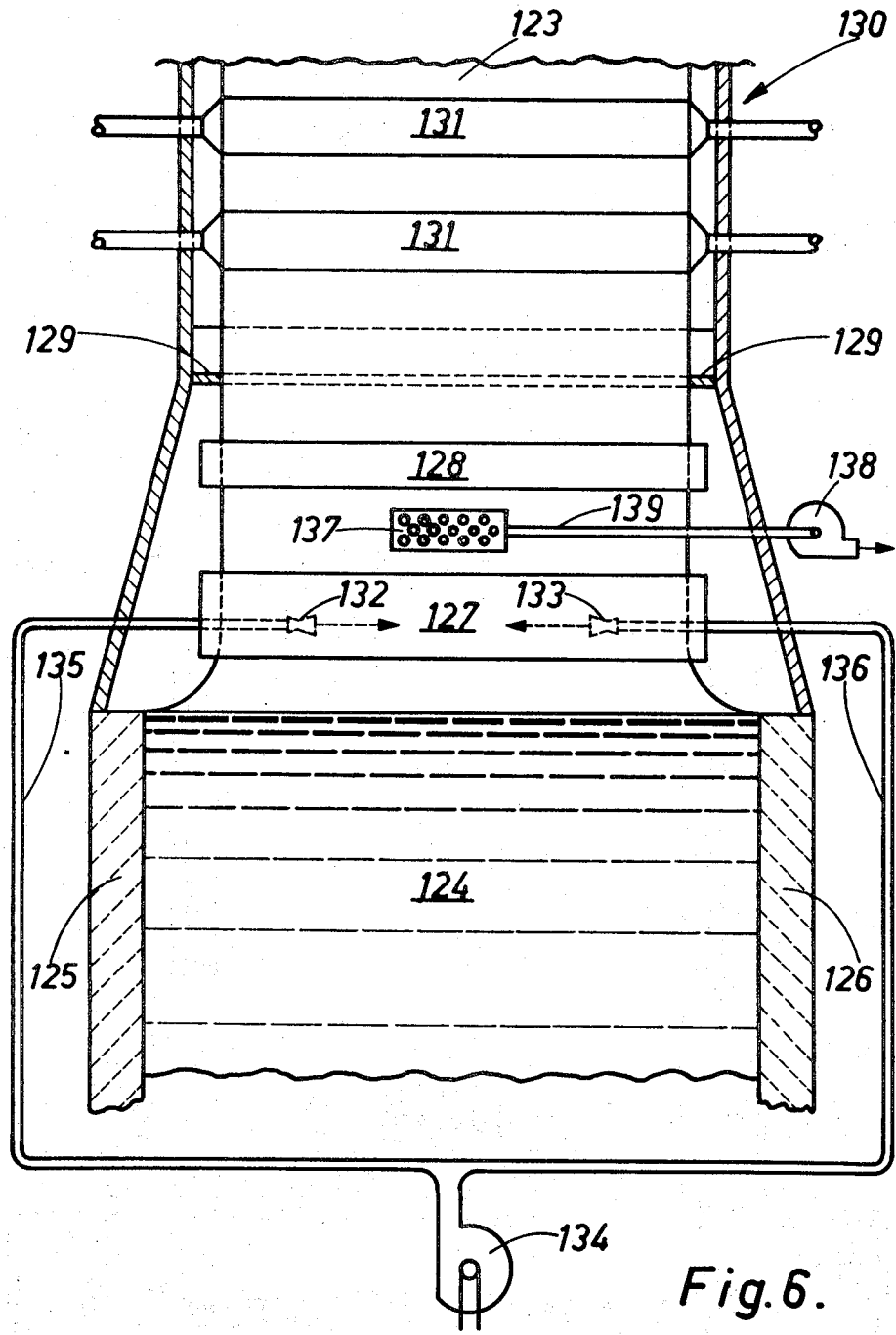
FIG. 6 is a cross-sectional, elevational end view of part of a drawing chamber provided with another particular embodiment of the invention.

FIG. 6 is a cross-sectional elevational end view of part of an apparatus for drawing a continuous ribbon of glass according to the Pittsburgh process.

FIG. 6 shows a ribbon of glass 123 being drawn from a bath of molten glass 124 contained in a drawing kiln, only the side walls 125 and 126 of which are shown. During the drawing operation, the ribbon of glass moves between main coolers, only one of which, 127, is shown. The ribbon then passes in front of a secondary cooler 128 and moves between the catch pans 129 to thereafter enter the annealing lehr 130, in which it is entrained by rollers 131.

According to the invention, injectors 132 and 133, located in a zone lying in the vicinity of the edge portions of the ribbon, are each positioned between a main cooler and the ribbon of drawn glass.

Such injectors are connected to an impeller 134 by means of conduits 135 and 136.

On the other hand, and independently of the gas withdrawal apparatus, there is disposed at a higher level within the drawing chamber a suction box 137 which is closed by a metal envelope bearing suction orifices. Box 137 is located in the central third portion of the ribbon width and is connected to a suction device 138 via a duct 139.

According to the invention, the impeller 134 and the suction device 138 are simultaneously put into operation in order to continuously displace the quantity of gas moving in the vicinity of the ribbon. The gases injected by the impeller 134 are perheated by known means not shown.

The embodiment of FIG. 6 may be constituted by but two injectors 132 and 133 and one suction box all disposed at one and the same side of the ribbon path, or two sets of these components may be provided with each set disposed to a respective side of the ribbon path.

In the embodiments of FIGS. 1 to 6, the gas flow rate produced by each tube within the space between any cooler and the glass ribbon, was of the order 35 to 300 litres/sec, while the diameter of the ducts was lying between 30mm and 200mm.

For example, in the case of the embodiment illustrated in FIGS. 1 and 2 the ducts 19–22 had a cross sectional dimension of 3,000mm$^2$ and the corresponding gas flow rate within the space between coolers 5 and the glass ribbon 1 attained 180 litres/sec.

As far as the embodiments shown in the other figures are concerned, the above mentioned data should be adapted to factors such as the drawing process, the sizes of the drawing machine, the flow rate of natural draughts, etc.

In any case it has been found that the ejection speed of gas from said ducts must be lower than 12 m/sec in order to avoid the setting up of turbulence.

It will be understood that the above description of the present invention is susceptible to various modifications, changes and adaptations, and the same are intended to be comprehended within the meaning and range of equivalents of the appended claims.

I claim:

1. In a process of manufacturing sheet glass by supplying molten glass to a drawing zone and drawing a continuous ribbon of glass from molten glass at that zone and along a path extending through a drawing chamber, in the lower portion of which there is a cooler and in which the ribbon becomes dimensionally set, and then through an annealing lehr contiguous with that drawing chamber, the improvement comprising:

withdrawing gas from the atmosphere in the drawing chamber at the side of the ribbon path at which the cooler is disposed and at a location which is at a greater spacing from the path of the ribbon than is the side of the cooler which faces the ribbon; and discharging a sufficient amount of gas into the atmosphere so as to cause gas to flow in two respective opposite directions across the ribbon path in the space between said path and said cooler while the step of withdrawing gas is being performed and without reducing the pressure in the chamber as a whole.

2. A process as defined in claim 1 wherein said steps of withdrawing and discharging are carried out continuously.

3. A process as defined in claim 1 wherein said steps of withdrawing and discharging are carried out intermittently.

4. A process as defined in claim 1 wherein there is a cooler at each side of the ribbon path and at least one of said steps of withdrawing and discharging is carried out at both sides of the ribbon path.

5. A process as defined in claim 1 wherein said step of withdrawing is carried out at a location above the top of the cooler.

6. A process as defined in claim 1 wherein there is, on at least one side of the ribbon path, in addition to the cooler in the lower portion of the drawing chamber, a secondary cooler located at a higher level in the drawing chamber, and said step of withdrawing is carried out at the general level of said secondary cooler.

7. A process as defined in claim 1 wherein said step of withdrawing is carried out at a location adjacent a vertical wall of the drawing chamber.

8. A process as defined in claim 7 wherein said step of withdrawing is carried out at a location adjacent the bottom of the front or rear boundary wall of the drawing chamber.

9. A process as defined in claim 1 wherein said step of discharging is carried to so as to cause gas to flow in respectively opposite directions transverse to the ribbon path.

10. A process as defined in claim 9 wherein said step of discharging is carried out so as to produce simultaneous flow of gas in the respectively opposite directions.

11. A process as defined in claim 9 wherein said step of discharging is carried out so as to cause gas to flow alternately in the respectively opposite directions.

12. A process as defined in claim 1 wherein said step of withdrawing is carried out at a location disposed opposite a central portion of the width of the ribbon.

13. A process as defined in claim 1 wherein said step of withdrawing is carried out at locations at opposite sides of a vertical plane normal to the ribbon and containing its longitudinal center line.

14. A process as defined in claim 1 wherein said steps of withdrawing and discharging are carried out by causing gas to flow through a duct in which the forces for causing such flow of gas are exerted by mechanical means.

15. A process as defined in claim 1 wherein said steps of withdrawing and discharging are carried out by causing gas to flow through a duct, and comprise generating flow forces by injecting gas at a location within that duct.

16. A process as defined in claim 15 wherein said step of generating is carried out, according to the ejector principle, by discharging gas through an injection tube which is located within a portion of the duct which has the form of a diffuser.

17. A process as defined in claim 15 wherein the flow forces are draft forces and said step of generating comprises discharging combustible gas within, and in a direction along, the duct, and burning this combustible gas within the tube.

18. A prcess as defined in claim 1 wherein the annealing lehr is a vertical lehr surmounting the drawing chamber.

19. A process as defined in claim 1 wherein the ribbon of glass drawn from the drawing zone is bent about a bending roll preparatory to passing into the annealing lehr which is substantially horizontal.

20. A process as defined in claim 1 wherein the ribbon of glass is drawn upwardly from a bath of molten glass of such depth that the molten glass which flows into the ribbon is derived from the upper levels of such bath.

21. A process as defined in claim 1 wherein the ribbon of glass is drawn upwardly from a supply of molten glass floating on a mass of material of higher specific gravity than the glass.

22. In apparatus for manufacturing sheet glass and including a drawing chamber and a contiguous annealing lehr, means for drawing a continuous ribbon of glass into the drawing chamber from a drawing zone fed with molten glass and conducting the ribbon along a path extending through the drawing chamber and annealing lehr, and a cooler located adjacent the ribbon path near the bottom of the drawing chamber, the improvement comprising:

means disposed in said drawing chamber for withdrawing gas from the atmosphere within said drawing chamber at a withdrawal location which is on the side of the ribbon path at which said cooler is present and which is at a greater spacing from the path of the ribbon than the ribbon-facing side of said cooler; and means in said drawing chamber for discharging gas into the chamber atmosphere at discharge locations so as to cause the gas to flow between said path and said cooler in two respectively opposite directions across the ribbon path.

23. Apparatus as defined in claim 22 wherein said means for withdrawing and said means for discharging comprise at least one duct which is located wholly within said drawing chamber and one end of which is located at the withdrawal location and the other end of which is located at the discharge location and means operatively associated with said duct for generating forces to cause gas to enter said one end of said duct from the atmosphere in said drawing chamber to flow along said duct, and to discharge from the said other end thereof.

24. Apparatus as defined in claim 23 wherein on at least one side of said ribbon path, there are two said ducts having their said one ends located at respectively opposite sides of a vertical plane normal to the ribbon and containing its longitudinal center line, and having their said other ends disposed in the lower portion of said drawing chamber and oriented for causing the gas flowing through said two ducts to be discharged into the atmosphere within said drawing chamber in respectively different directions transverse to the ribbon path, between that path and said cooler.

25. Apparatus as defined in claim 23 wherein said means for generating forces comprise mechanical means.

26. Apparatus as defined in claim 23 wherein said means for generating forces comprise a gas injection tube disposed within said duct, and means connected to said tube for delivering gas thereto to cause such gas to be injected into said duct through said injection tube.

27. Apparatus as defined in claim 26 wherein said injection tube and the portion of said duct surrounding said injection tube are constructed to function as an ejector.

28. Apparatus as defined in claim 23 further comprising means associated with said other end of said duct for promoting laminar flow of gas discharged from said duct.

29. Apparatus as defined in claim 22 wherein said annealing lehr is a vertical lehr surmounting said drawing chamber.

30. Apparatus as defined in claim 22 further including a bending roller about which the drawn glass ribbon bends when the apparatus is in use and wherein said annealing lehr is substantially horizontal.

31. Apparatus as defined in claim 22 further including a supply channel for holding a bath of molten glass of such depth that when the apparatus is in use molten glass flows into the ribbon only from the upper levels of such bath.

32. Apparatus as defined in claim 22 further including a molten glass feed channel along which molten glass feeds to the drawing zone while floating on a mass of material of higher specific gravity than the glass.

33. Sheet glass manufactured by the process defined in claim 1.

* * * * *